United States Patent [19]
Shirrell

[11] Patent Number: 5,458,841
[45] Date of Patent: Oct. 17, 1995

[54] METHOD FOR MAKING PRESTRETCHED FILM

[75] Inventor: Jack N. Shirrell, Acworth, Ga.

[73] Assignee: Illinois Tool Works Inc., Glenview, Ill.

[21] Appl. No.: 238,014

[22] Filed: May 3, 1994

Related U.S. Application Data

[62] Division of Ser. No. 756,063, Sep. 6, 1991.

[51] Int. Cl.$^6$ .......................... B29C 55/28; B29C 61/08; B29C 65/68
[52] U.S. Cl. ...................... 264/230; 53/211; 53/556; 156/229; 264/514; 264/289.6; 264/342 RE; 425/140; 425/326.1
[58] Field of Search ...................... 264/564, 514, 264/40.3, 289.6, 342 RE, 230, 288.4; 53/556, 399; 156/229, 244.14, 244.11; 425/326.1, 140

[56] References Cited

U.S. PATENT DOCUMENTS

| | | | |
|---|---|---|---|
| 4,189,288 | 2/1980 | Halter | 264/40.3 |
| 4,277,594 | 7/1981 | Matthews et al. | 264/289.6 |
| 4,336,212 | 6/1982 | Yoshimura et al. | 264/210.2 |
| 4,336,679 | 6/1982 | Lancaster et al. | 53/399 |
| 4,436,888 | 3/1984 | Copple | 264/342 RE |
| 4,767,578 | 8/1988 | Thimon | 264/288.4 |
| 4,835,218 | 5/1989 | Yoshimura et al. | 525/98 |
| 4,862,678 | 9/1989 | Humphrey | 53/556 |
| 4,953,336 | 9/1990 | Lancaster et al. | 53/556 |
| 5,017,323 | 5/1991 | Balk | 264/288.4 |
| 5,186,981 | 2/1993 | Shellhamer et al. | 427/247 |

*Primary Examiner*—Jeffery R. Thurlow
*Attorney, Agent, or Firm*—Trexler, Bushnell, Giangiorgi & Blackstone, Ltd.

[57] ABSTRACT

A novel process and novel apparatus for producing prestretched plastic film is presented. The method and apparatus are capable of forming a film from molten material and cooling the film to a non-molten condition so the film can be stretched. The cooled film is engaged and passed through a primary nip and second nip to plasticly and elastically stretch the cooled film to cold orient the film such that the film is stretched beyond the material's yield point. The cooled film is engaged with a plurality of idler rollers at a relatively low tension over a distance sufficient to allow the cooled film to relax to recover a major portion of its elastic deformation. Thereafter, the film is formed into a roll prior to being affixed to a unit.

19 Claims, 2 Drawing Sheets

METHOD FOR MAKING PRESTRETCHED FILM

This is a divisional of application Ser. No. 07/756,063, (now pending) filed on Sep. 6, 1991.

BACKGROUND AND SUMMARY OF THE INVENTION

The present invention relates generally to a novel prestretched film for packaging and stretch wrapping, produced by a unique method with a novel apparatus.

The construction and properties of films, and methods and processes for making the same are well known in the relevant art, as is indicated by the following United States patents, for example

| | | |
|---|---|---|
| Alles | 2,767,435 | 10/23/56 |
| Holladay et al. | 3,244,680 | 04/05/66 |
| Hufnagel et al. | 3,351,697 | 11/07/67 |
| Colombo | 4,456,660 | 06/26/84 |
| Chill | 3,619,460 | 11/09/71 |
| Stockmeyer | 4,676,943 | 06/30/87 |
| Thimon | 4,767,578 | 08/30/88 |

Stretch wrap films are used quite extensively in the modern world. Specifically, stretch wraps are used to secure separate unitary packages together to form a unit. The stretch wraps can also attach the unit to a support member, such as a pallet and the like. Thus, stretch wraps are commonly used in shipping articles from one place to another. The stretch wraps hold the individual packages together to reduce their shifting during transport as well as to assist in preventing damage to them and their contents. Accordingly, stretch wraps are used extensively in transporting packages from a manufacturer to a warehouse, stores, and to end consumers, for instance. To function properly, these films should be stretchable to tightly hold the packages, and also should have a resiliency sufficient for constricting around and conforming to an external configuration of the unit formed by the packages. However, some of these films constrict so tightly around the external configuration as to damage the packages and their contents. Additionally, these films are often composed of polyethylene, polyvinyl chloride, ethylene vinyl acetate, ethylene methyl acetate, and ethylene copolymer with higher alpha olefins, commonly referred to generally as linear low density polyethylene (hereinafter "LLDPE") films. These compounds are somewhat costly to manufacture.

In an effort to solve a portion of the cost problem, some film producers have reduced the gauge or thickness of the films, thereby reducing somewhat the amount of material required for a particular packaging situation. Heretofore, this has been done by stretching or drawing the plastic while it is still in the molten state at a relatively high temperature as it exits from the extruder. Some persons have even stated that stretch wrap films having a reduced thickness are stronger than thicker films.

These statements, however, are not precisely correct. The more correct statement is that a decrease in film thickness almost invariably results in a significant decrease in absolute strength, hereinafter referred to as "AS" (units of breakage force per units of width), while the oft-reported relative tensile strength, hereinafter referred to as "RTS" (units of breakage force per unit of cross sectional area), may remain constant, or even increase. This does not result in a stronger film, but is a simple misinterpretation of the underlying mathematics. For example, if the thickness of the film is reduced by 50 per cent, and the absolute strength decreases by 40 per cent, then the relative tensile strength increases by 20 per cent. Specifically, if it takes 100 pounds of force to break a 20 inch wide by 1.0 mil thick film, then:

$$AS=100 \text{ lbs}/20 \text{ in}=5.0 \text{ lbs/in.}$$

$$RTS=100 \text{ lbs}/(20 \text{ in}\times 0.001 \text{ in})=5000 \text{ lbs/square in.}$$

And, if it takes 60 pounds of force to break a 20 inch wide by 0.5 mil thick film, then:

$$AS=60 \text{ lbs}/20 \text{ in}=3.0 \text{ lbs/in}$$

and, $$RTS=60 \text{ lbs}/(20 \text{ in}\times 0.0005 \text{ in})=6000 \text{ lbs/square in.}$$

Thus, the 50 per cent downgauging has resulted in a weaker film because AS is significantly lower in the downgauged film. An unsuspecting person, by simply looking at the numbers without understanding the underlying mathematics, might believe that the downgauged film is stronger. RTS is not a reliable indication of film strength because the thickness of the film appears in the denominator, making any reduction in thickness appear to create a stronger film.

The prestretched film, and the unique apparatus and method for producing the same, according to the teachings of the present invention, is intended to assist in solving some of the above-detailed problems, among others, while still providing a viable product.

OBJECTS AND SUMMARY OF THE INVENTION

A general object of the present invention is to provide a novel prestretched film for wrapping and packaging a plurality of articles together as a unit.

A more specific object of the invention is to provide a novel method for making prestretched pallet wrap and packaging film.

Another object of the present invention is to provide a method for making stretch wrap and packaging film which conserves a greater amount of film than other, currently available methods.

An additional object of the invention is to provide a stretch wrap film which provides controlled tensioning without disrupting load integrity.

A further object of the present invention is to provide a stretch wrap film which provides the same advantages to hand wrappers as are afforded to power prestretch wrappers.

Another object of the invention is to provide a stretch wrap film which has particular utility with hand wrappers.

An additional object of the present invention is to provide a film for wrapping and packaging which is less stiff, more elastic, less brittle, and more tear resistant than other, currently available films of similar thickness.

A further object of the invention is to provide a film for wrapping and packaging which is less costly to use than other, currently available films.

Another object of the present invention is to provide a stretch wrap film which lacks problems associated with stretch film recovery after application of the film to a unit.

Still another object of the invention is to provide a novel prestretched resilient film having an improved strength to weight ratio, and usable as a stretch wrap and alternatively for carriers for containers and other articles.

An apparatus and method, according to the present invention, for making a prestretched film comprises means for and steps of: forming a film from molten stock material; cooling the film; stretching the cooled film beyond the stock material's yield point; and relaxing the stretched film to reduce the tension therein.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements in which.

DETAILED DESCRIPTION OF THE PREFERRED EMBODIMENT

Figure 1:
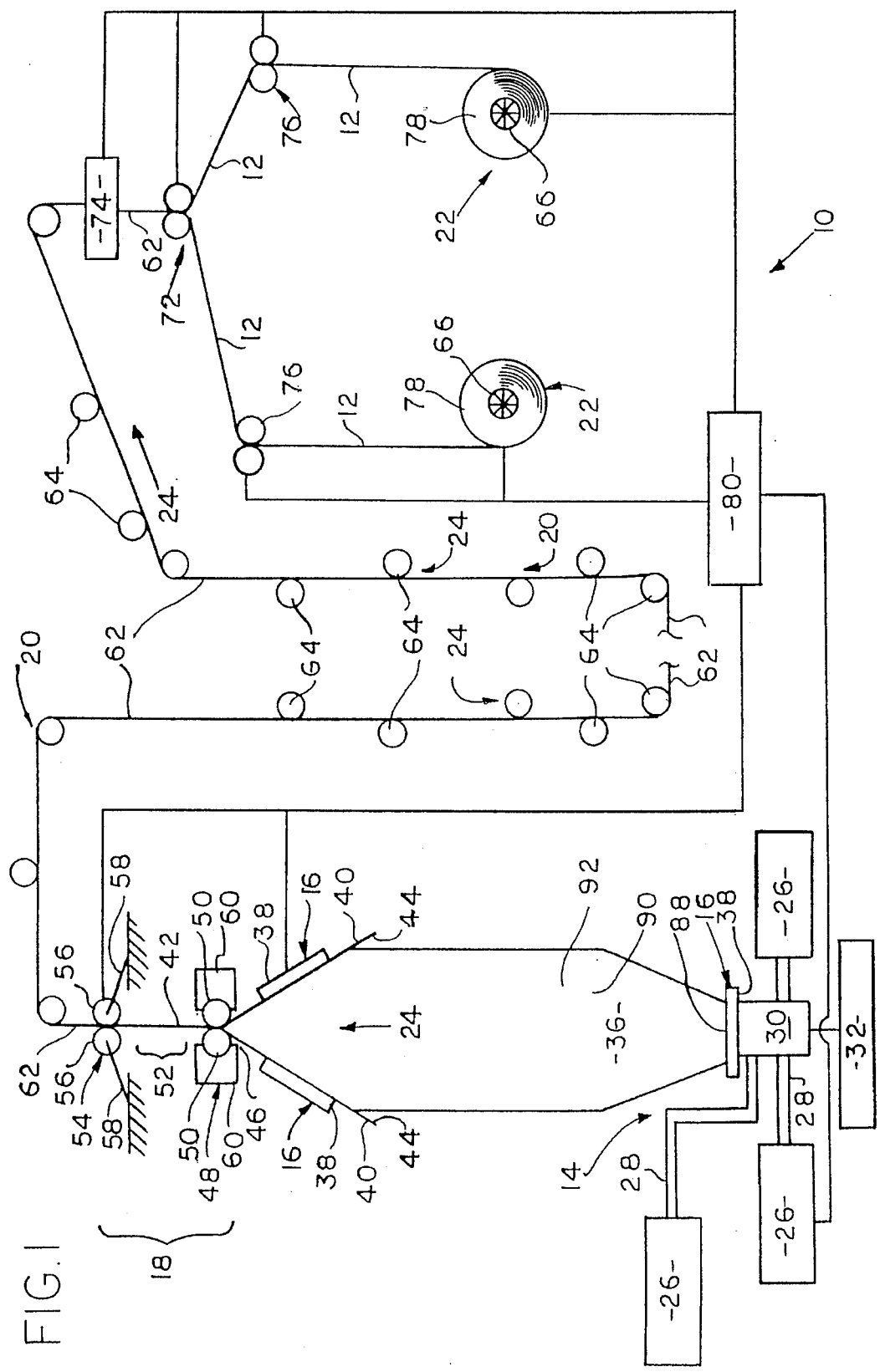
FIG. 1 is a block schematic diagram of a device for employing the method of the present invention to produce prestretched film, constructed according to the teachings of the present invention.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Referring generally to FIG. 1, an apparatus 10 for producing a prestretched film 12, according to the teachings of the present invention, is illustrated in block schematic form.

Specifically, the apparatus 10 comprises means 14 of known construction for forming a film from molten material, means 16 for cooling the film, means 18 for stretching the film beyond the yield point of the stock material, means 20 for relaxing the stretched film, and a means 22 for winding the film into a roll. All of the means 14 through 22 are located along a film production line 24. The means 16 is located along the production line 24 between the means 14 and the means 18, while the means 20 is located between the means 18 and the means 22. The preferred embodiments and specific functionality of the means 14 through 22 will become more clear herein.

It is to be noted that the film 12 can be extruded by a plurality of suitable methods. While the invention will be specifically disclosed with relation to film extrusion utilizing air blowing techniques, well known in the art, wherein a round tube of molten stock material is inflated to produce a bubble which is later collapsed, it is to be understood that the invention is not to be limited to that type of film extrusion method. The invention can be successfully employed with other film producing methods, such as chill roll casting, tubular bath extrusion, and the like.

As illustrated in FIG. 1, the means 14 for forming a film preferably comprises a plurality of extruders 26 connected by means of feeder tubes 28 to a die 30. The extruders 26 are connected to a source, possibly incorporated therein, of stock material, such as LLDPE, and the like, not shown for clarity.

The construction and operation of the extruders 26 is well known in the relevant art. The number of extruders 26 utilized in the apparatus 10 depends upon the desired composition of the film 12. For instance, if the film 12 is desired to have a tri-layered construction, with each layer having different characteristics, then three extruders 26 would commonly be used. This specific means 14 construction is particularly useful in co-extruding cling layers on one or both sides of a strong substrate, thereby producing a film 12 which has sufficient strength to resist tearing and has sufficient cling to enable it to stick to itself under tension.

The extruders 26 heat the stock materials to a molten condition, and deliver the molten stock materials to the die 30 through the feeder tubes 28. The die 30 has means, well known in the art, for producing a desired extruded configuration. In the case of blown films, the die 30 is configured so as to produce a round, hollow tube of molten stock materials. The die 30 is further provided with a stream of air, supplied by a well-known compressed air source 32 to the die 30 by means of a suitable feeder line 34. The compressed air enters the die 30 and is supplied to the interior of the hollow tube. The compressed air enters the tube and inflates it into a substantially tubular bubble 36. Alternatively, the bubble 36 can be inflated and additionally cooled with internal bubble cooling (IBC) equipment, known to those skilled in the art.

The bubble 36 is continuously drawn away as more and more stock material is supplied to the die 30 by the extruders 26. Thus, an end of the bubble 36 moves further and further away from the die 30 along the production line 24 towards the means 18. To regulate the shape of the bubble 36, to strengthen its outer periphery so that the compressed air will not form holes through the bubble 36, and to solidify or freeze the plastic, cooling means 16 are provided along the production line 24.

The cooling means 16 is commonly in the form of blowers 38, which direct controlled streams of air against the periphery of the bubble 36. Preferably, the air comprising the streams is cooled or chilled by suitable means, such as an air conditioner, and the like, and the streams are directed against the interior and exterior periphery of the bubble 36. The blowers 38 reduce the temperature of the stock material comprising the bubble 36 past its freezing point and approximately equal to ambient temperature. The bubble material changes from a molten condition to a substantially frozen condition at a relatively short transition zone indicated by the reference numeral 90. At the frozen point, the bubble 36 is moving at a lineal rate or speed determined by a primary nip 48, as described below. In a preferred construction of the apparatus 10, blowers 38 are provided at a plurality of locations along the production line 24 between the die 30 and the stretching means 18.

The bubble 36 continues along the production line 24 until it encounters a collapsing device 40. The collapsing device 40 is intended to collapse the bubble 36 into a sheet 42 of film material. The sheet 42 accordingly is often two-ply having two sides joined at their common edges. The collapsing device 40 itself is well-known in the relevant art, and is generally frusto-conical in shape. Specifically, the collapsing device 40 has a large opening 44 which opposes the die 30, and a small opening 46 which opposes the stretching means 18.

Accordingly, the bubble 36 enters the large end 44 and is collapsed by confrontation with frusto-conical surface of the device 40, and exits the small opening 46 as the sheet 42 of film material. To facilitate collapsing of the bubble 36, and to insure the structural integrity of the film material, additional cooling means 16 are disposed proximate the collapsing device 40. Thus, the sheet 42 is frozen and relatively cold (i.e. far from its melting point) as it exits the small opening 46.

The bubble 36 is drawn or pulled through the collapsing device 40 to form the sheet 42 by a primary nip or pair of rollers 48. The primary nip 48 generally comprises a plurality of driven rollers 50 which engage the sheet 42 on opposite sides thereof, and is generally well-known in the art. Accordingly, the thickness of the sheet, and thus the thickness of the film going into the primary nip 48, is determined by the extrusion rate, the diameter of the bubble 36, and the speed at which the sheet 42 is drawn through the collapsing device 40 by the primary nip 48.

The sheet 42 passes through the primary nip 48 and enters a cold orientation zone 52. It is important to remember that the sheet 42 is frozen after it leaves the transition zone 90 and is relatively cold (i.e. far from its melting point) as it passes through the primary nip 48. The cold orientation zone 52 is bounded by the primary nip 48 and an intermediate nip or pair of rollers 54. The intermediate nip 54 is comprised of a plurality of driven rollers 56 which engage the sheet 42 on opposite sides thereof. It is to be noted that the utilization of pairs of rollers to comprise the primary and secondary nips 48 and 54, respectively, as opposed to other, equally functional constructions, serves to reduce surface blemishes on the film 12.

The rollers 56 of the intermediate nip 54 are attached to shifting means 58 for pivoting the rollers 56 between a sheet 42 engaging position and a retracted position, whereat the rollers 56 do not engage the sheet 42. The shifting means 58 are particularly useful for facilitating start-up and transition of the apparatus 10. Thus, the apparatus 10 can be used to produce film 12, as well as other, conventional films. Preferably, the intermediate nip 54 is spaced in close proximity to the primary nip 48 in order to minimize neck-in.

The intermediate nip 54 is moved or rotated at a speed substantially greater than a corresponding speed of primary nip 48 movement or rotation. Specifically, the intermediate nip 54 is rotated at a speed approximately four times the corresponding speed of the primary nip 48. Accordingly, the sheet 42 is cold oriented, or stretched beyond its yield point between the primary nip 48 and the intermediate nip 54 within the cold orientation zone 52. It is to be noted that the cold-orientation of the sheet 42 assists in maximizing desirable gloss on the film 12.

The sheet 42 is stretched approximately proportional to the relative rate of speeds of the primary nip 48 and the intermediate nip 54. Thus, the primary nip 48 and the intermediate nip 54 comprise the stretching means 18. This is a distinct difference between the invention and the film making methods of the prior art wherein the sheet was stretched or drawn only while hot or molten.

In order to insure proper cold orientation or stretching of the sheet 42, the relative speeds of the primary and the intermediate nips 48 and 54, respectively, should be preserved. To do this, braking means 60 is provided. The braking means 60 is connected to the primary nip 48, and is intended to regulate the speed of roller 50 rotation.

The braking means 60 can take on a plurality of forms. Specifically, embodiments of the braking means 60 include, but are not limited to a regenerative drive direct current motor, a mechanical brake, an electrical brake, and mechanically gearing the primary nip 48 off of the intermediate nip 54. Accordingly, the primary nip 48 not only controls the thickness of the sheet 42 before cold orientation, but also regulates the amount of sheet 42 entering the cold orientation zone 52. Also, the primary and intermediate nips, 48 and 54, respectively, may be provided in an "S-wrap bridle" configuration, well known to those having skill in the relevant art.

Once the sheet 42 has passed through the cold orientation zone 52 and the intermediate nip 54, the sheet 42 has been transformed into a prestretched sheet 62 having at least two sides joined along common edges. It is to be noted that as the sheet 62 exits the intermediate nip 54, the sheet 62 has been stretched beyond its yield point.

Idler rollers 64 comprising the relaxing means 20 are disposed along the film production line 24 between the intermediate nip 54 and the winding means 22. The idler rollers 64 function to allow elastic or recoverable strain to "relax out" of the sheet 62 before encountering the winding means 22, thereby allowing the sheet 62 to recover a portion of its original total deformation, as will be discussed herein.

Relaxing of the sheet 62 reduces tension in the film to a level allowing winding of the film 12 onto a core 66, usually composed of a wound paper product, without crushing the core 66. Stronger core 66 constructions may be required-depending upon the amount of film 12 to be wound thereon. More importantly, the sheet 62 is relaxed in order to insure that the film 12 has sufficient elasticity to constrict around and to conform to an external configuration 68 formed by a unit 70 or article to be packaged, as will be discussed further herein. Additionally, by retaining this sufficient elasticity, the film 12 can absorb shocks and other forces attendant with shifting of the unit 70 or package article without rupturing or fracturing.

However, the relaxing process is not immediate, but takes a certain amount of time. To assure that the sheet 62 has the time needed to relax properly, the production line 24 is elongated with many idler rollers 64. The sheet 62 is engaged by the idler rollers 64 at a relatively low tension to allow the sheet 62 to relax. Accordingly, the sheet 62 moves a considerable distance along the idler rollers 64; that distance divided by the speed of sheet 62 travel determining the time available to relax the sheet 62.

The production line 24 continues along the idler rollers 64 to a secondary nip or pair of rollers 72, the construction and operation of which are well known in the art. If it is desired to produce a two-ply film 12, the sheet 62 passes through the secondary nip 72 towards the winding means 22, whereat the sheet 62 is wrapped upon a core 66.

However, if it is desired to produce two single-ply films 12, certain modifications are made to the above-disclosed apparatus 10. Specifically, trimming means 74 is disposed on the production line 24 between the idler rollers 64 and the secondary nip 72, as shown in FIG. 1. The trimming means 74 is well known in the relevant art, and is intended to slit or open the common edges of the sides of the sheet 62.

As noted above, use of the film 12 conserves a greater amount of film than use of prior art films. One aspect of this conservation presents itself at the trimming means 74. Because the film 12 is reduced in thickness when it is cold-oriented and relaxed, less scrap material is produced by the trimming means 74, as opposed to the prior art films. Specifically, the proportion of usable film 12 to sheet 62 produced is higher than the proportion of usable prior art film to prior art sheet produced. By reducing the amount of scrap produced by the trimming means 74, more film 12 is conserved and produced in a given time period, and the manufacturer saves revenues by being able to forego extensive recycling efforts.

With the common edges slit, the two-ply construction of the sheet 62 can be separated into two films 12. The two films 12 are separated by tertiary nips or pairs of rollers 76, also well known in the art. After the films 12 pass through the tertiary nips 76, the films 12 are wound upon suitable cores 66 by the winding means 22. The winding means 22 collects the films 12 upon the cores 66 to form rolls 78 of film 12.

The operation of the entire apparatus 10 is regulated and monitored by a control circuit 80. The control circuit 80 is capable of energizing all of the elements of the apparatus 10. Because threading of the apparatus 10 may be difficult when producing film 12 the control circuit 80 can alter the functionality of the apparatus 10 in order to facilitate threading thereof.

Specifically, when starting up the apparatus 10, the control circuit 80 can cause the shifting means 58 to move the intermediate nip 54 into the retracted position to allow easy threading of the apparatus 10 or to produce conventional film. Once the apparatus 10 is threaded, the control circuit 80 can cause the shifting means 58 to move the intermediate nip 54 into the sheet engaging position to produce film 12. The control circuit 80 then brings the intermediate nip 54 up to its proper speed relative to the primary nip 48 along with all of the other elements of the apparatus 10. The control circuit 80 also monitors the relative speeds of the primary and intermediate nips, 48 and 54, respectively, and actuates the braking means 60 as necessary.

The film 12 is constructed according to the teachings of the present invention from a plastics material by the above-described method, it is believed, to give the film 12 a particular molecular structure. As the sheet 42 enters the cold orientation zone 52, the sheet 42 has a molecular structure which is moving substantially in correspondence with a cooled, frozen phase of the material. Thus, the molecular structure of the frozen sheet 42 is more stable and substantially more regularly aligned than the molecular structure of a hotter, substantially molten sheet.

In the cold orientation zone 52, it is believed that the molecular structure of the sheet 42 is physically stretched by the stretching means 18, thereby physically elongating the molecular structure by both plastic deformation and elastic deformation. This causes the individual molecules of the sheet 42 to become substantially regularly aligned to an even greater degree. This is an improvement over the prior art wherein the molecular structure was comparatively disordered corresponding to the higher temperature state of the sheet during hot molten stretching. In addition, it is believed that the relaxing means relaxes the substantially aligned molecular structure after the physical stretching thereof by the stretching means 18 in order to allow the sheet 62 to recover a major portion of its elastic deformation without causing misalignment of the molecular structure, or undue thickening of the film 12.

To achieve the formation of the film 12, elements of the production line 24 are run at certain related rates. By way of example only, if the primary nip 48 is run at a rate of approximately two hundred and fifty feet per minute, then the intermediate nip 54 is run at a rate of approximately one thousand feet per minute; a rate approximately four times the rate of the primary nip 48. These related rates cause the sheet 42 to be stretched in the cold orientation zone 52.

To relax the sheet 62, the secondary nip 72 is run at a rate of approximately seven hundred and fifty feet per minute. The sheet 62 accordingly relaxes along the idler rollers 64 for an expanse of approximately one hundred feet before encountering the secondary nip 72. This allows the sheet 62 to recover approximately one-quarter of its original total deformation which corresponds to the elastic portion of the deformation. It is to be understood that different run rates and relaxation distances can be utilized without departing from the scope of the present invention. To illustrate the cold orientation and relaxation of the sheet 62 more fully, the following example is provided. The die is preferably provided with a gap substantially within the range of 100 to 110 mil (i.e. thousandths of an-inch). When the bubble 36 exits the die 30, it has a wall thickness approximately equal to the dimensions of the gap, at a location indicated by point 88. The bubble 36 is then inflated and stretched by the compressed air source 32 so that the bubble 36 has a thickness substantially within the range of 50 to 55 mil, at the transition zone 90.

After the bubble 36 forms its substantially tubular shape, and is drawn through the transition zone 90, its thickness is reduced to approximately 1.15 mil, at a location indicated by point 92. The bubble is now frozen, and enters the primary nip 48. In the cold orientation zone 52, the sheet 42 is cold stretched or oriented, partially beyond the elastic limit of the material so that there is both plastic stretching and elastic stretching, thereby reducing its thickness to approximately 0.29 mil. It is to be noted that the sheet 42 is in a cold and frozen state in the cold orientation zone 52. The sheet 42 exits the cold orientation zone 52, and progresses along the relaxation means 20. Here, the sheet 62 is relaxed sufficiently to allow the elastic portion of the stretching procedure substantially to recover, and the sheet 62 to attain a thickness of approximately 0.38 mil.

As the thickness of the sheet 62 increases from 0.29 mil towards 0.38 mil, approximately, the sheet 62 recovers a portion of its total deformation. Specifically, total deformation is comprised of at least two elements: plastic deformation and elastic deformation. The distinction between these two elements is that plastic deformation is substantially not recoverable, while elastic deformation is recoverable, at least to a certain degree, depending upon the particular characteristics of the material being deformed. Thus, as the sheet 62 is relaxed, it recovers a portion, preferably most, of its elastic deformation, which comprises a portion of the total deformation.

Accordingly, the film 12 provides significant advantages over films of the prior art. The film 12 provides controlled tensioning without disrupting load integrity. The film 12 is less stiff, more elastic, less brittle, and more tear resistant than other films. The film 12 also lacks problems associated with stretch film recovery often attendant with other films. Specifically, since the film 12 has been prestretched and relaxed while in a cold or frozen condition, the film 12 does not require stretching, only tensioning, when used to secure the unit 70 or other articles in other types of packaging, whereby the film 12 does not constrict around a unit 70 so as to damage it after the film 12 has been applied.

Figure 2:
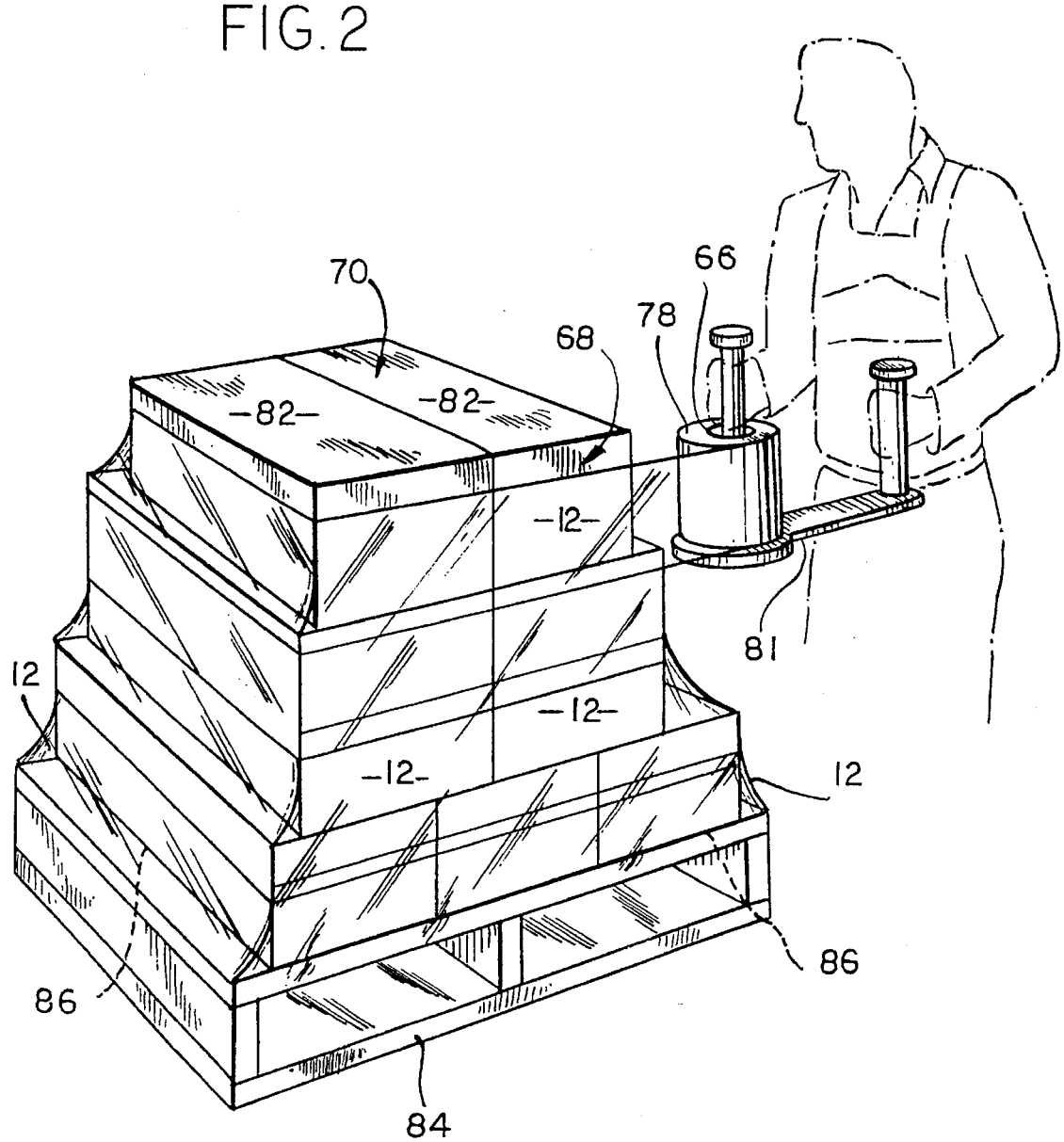
FIG. 2 is a side elevational view of a unit placed on a support structure, such as a pallet, forming an external configuration around which the prestretched film is applied.

The film 12 of the present invention has, as indicated above, particular utility with hand wrappers. Illustrated in FIG. 2 is a method for applying the film 12 to a unit 70 by means of a commonly known hand wrapping device 81. The unit 70 may be a solitary object or may be comprised of a plurality of smaller packages 82. The unit 70 defines a definite external configuration 68, as discussed above, around which the film 12 can be applied. In many applications, the unit 70 is placed upon a suitable support platform 84, such as a pallet and the like.

A roll 78 is placed on the device 81, and an end of the film 12 is unrolled. The end of the film 12 is affixed to the external configuration 68 and/or the support platform 84 at a point proximate to the juncture 86 of the unit 70 and the support platform 84. The end may be affixed by use of tape, tying it to the unit 70 or support platform 84, or by simple contact, if the film 12 has sufficient cling.

The film 12 is unrolled from the roll 78, and is applied in a substantially spirally helical manner to the external configuration 68. Preferably, adjacent convolutions of the film 12 overlap each other somewhat to provide structural integrity and protection to the unit 70. The film 12 conforms to the external configuration 68. As the unit 70 is wrapped with the film 12, the film 12 is tensioned by device 81. The film 12 is removed from the roll 78 by tearing or cutting with a suitable tool, such as a knife and the like. The resultant free end of the film 12 is attached to the unit 70 in a similar fashion as that disclosed above.

Because the film 12 has been cold oriented and relaxed, the film 12 provides a wrap which is substantially as economical when applied by a hand wrapping device 81 as wraps provided by applying prior art films to the unit 70 by a power stretching device, or the like. Thus, the unit 70 can be securely held by the film 12 without the use of a expensive power tool, resulting in greater revenues to the user.

Additionally, since the film 12 does not need to be stretched significantly when affixed by hand to the unit 70, the above-discussed problems associated with the prior art film recovery after-application thereof to a unit 70, which may be magnified by use of a power stretching device.

Specifically, because the film 12 has been cold-oriented and relaxed to obtain a reduced wall thickness, the film 12 does not have to be stretched as it is applied to the external configuration 68 of the unit 70 in order to obtain desired savings of the material. Because the film 12 has been pre-stretched and reduced in wall thickness as compared to prior art films, the film 12 may merely be tensioned around the unit 70 upon application. Since the film 12 is not stretched around the unit 70, there is no tendency to shrink or to recover over time to an extent which may damage the unit 70. The film 12 accordingly has special utility with hand wrapping devices.

Moreover, when the unit 70 formed by a plurality of packages 82 is hand wrapped upon a support platform 84 by the film 12, the unit 70 shifts, upon jostling often attendant with transport, to a lesser degree than when the unit 70 is hand wrapped by prior art films in the same manner. Thus, the film 12 provides better control of unit 70, or of individual package 82 movement within the hand wrapped unit 70, and better load containment than similar hand wrapped applications of prior art films. It is believed that this is due to the presence of a greater amount of available plastic deformation in the prior art films than that present in the film 12. Thus, when combined with the material conservative properties of the film 12, the film 12 provides better load integrity than the prior art films.

While preferred embodiments of the present invention have been shown and described, it is envisioned that those skilled in the art may devise various modifications of the present invention without departing from the spirit and scope of the appended claims. The invention is not intended to be limited by the foregoing disclosure, but only by the following appended claims.

The invention claimed is:

1. A process for producing prestretched plastic film comprising the steps of: forming a film from molten material; cooling the film to a non-molten condition, said material of the cooled film having a predetermined yield point; engaging the cooled film with a primary nip; passing the film through the primary nip; engaging the cooled film with a second nip; moving the second nip at a speed substantially greater than a corresponding speed of the primary nip and thereby plasticly and elastically stretching the cooled film to cold orient the film such that the cooled film is stretched beyond said predetermined yield point; engaging the stretched film with a plurality of idler rollers at a relatively low tension over a distance sufficient for allowing the cooled film to relax to recover a major portion of its elastic deformation; and subsequently forming a roll of the film.

2. A method of producing a prestretched plastic film comprising the steps of: forming a film from molten material; cooling the film to a non-molten condition, said material of the cooled film having a predetermined yield point; stretching the cooled film beyond said predetermined yield point to plasticly and elastically deform the cooled film; and relaxing the cooled stretched film to reduce the tension therein to recover a major portion of its elastic deformation prior to affixing the cooled stretched film to a unit.

3. A method as defined in claim 2 further comprising the step of forming a roll of the relaxed stretched film.

4. A method as defined in claim 2 wherein the film is cooled to a temperature approximately equal to ambient temperature.

5. A method for wrapping a unit having an external configuration with a prestretched plastic film, comprising the steps of: forming a film from molten material; cooling the film to a non-molten condition, said material of the cooled film having a predetermined yield point; stretching the cooled film beyond said predetermined yield point to plasticly and elastically deform the cooled film; relaxing the cooled stretched film prior to affixing the stretched film to the unit to reduce the tension therein to recover a major portion of its elastic deformation while maintaining sufficient elasticity to constrict around and to conform to an external configuration of the unit to be wrapped; winding the film into rolls prior to affixing the stretched film to the unit; subsequently fixing one end of the film proximate to the unit; applying the film to the external configuration; and tensioning the film to cause the film to conform closely to the external configuration of the unit.

6. A method as defined in claim 2 wherein the cooled film is relaxed sufficiently to substantially remove long term recovery properties therein.

7. A method as defined in claim 2 wherein the cooled film is stretched to a thickness of approximately 0.29 mil, and relaxed to a thickness of approximately 0.38 mil.

8. A method for wrapping a unit having an external configuration with a prestretched plastic film, comprising the steps of: providing a prestretched film which has been formed by forming a film from molten material; cooling the film to a non-molten condition said material of the cooled film having a predetermined yield point; stretching the cooled film beyond said predetermined yield point to plasticly and elastically deform the cooled film and relaxing the cooled stretched film to reduce the tension therein to recover a major portion of its elastic deformation prior to affixing the cooled stretched film to the external configuration of the unit; applying the cooled stretched film to the external configuration; tensioning the applied film without significantly stretching the film so as not to cause a material reduction in thickness of the film; and the film having sufficient elasticity which allows the film to be tensioned around the unit to conform closely to the external configuration thereof.

9. An apparatus for producing a prestretched plastic film comprising: means for forming a film of molten material; means for cooling the molten film to a frozen, non-molten phase; means for stretching the frozen film to obtain both elastic and plastic stretching of the material; and means for relaxing tension in the cooled stretched film for reducing the elastic stretching to recover a major portion of the elastic deformation of the film prior to attaching the cooled stretched film to a unit while maintaining u sufficient elasticity for tensioning said film around the unit.

10. An apparatus as defined in claim 9 wherein the means for forming a film of molten material form a substantially molten film with a substantially pre-determined wall thickness at a predetermined rate of feet per minute.

11. An apparatus as defined in claim 9 wherein the means for cooling the film comprises a blower for directing a cool stream of gas against the film.

12. An apparatus as defined in claim 10 wherein the means for stretching the cooled film comprises a first nip engagable with the frozen film and operating at substantially the predetermined rate, and a second nip engagable with the film after the first nip and operating at a rate substantially faster than the first nip.

13. An apparatus as defined in claim 12 wherein the second nip moves at a speed approximately four times the corresponding speed of the first nip.

14. An apparatus as defined in claim 10 wherein the means for relaxing tension in the cooled film comprises a plurality of idler rollers spaced to give the cooled film time sufficient to relax.

15. An apparatus as defined in claim 13 which includes a third nip engagable with the film after the idler rollers and operating at a rate faster than the first nip and slower than the second nip.

16. An apparatus as defined in claim 13 further comprising braking means for controlling the corresponding speed of the first nip so as to preserve relation between the-speeds of the first and second nips.

17. An apparatus as defined in claim 12 wherein the second nip is shiftable between a film engaging position and a retracted position.

18. An apparatus as defined in claim 15 further comprising winding means for forming a roll of the film emerging from the third nip.

19. An apparatus as defined in claim 18 further comprising a control circuit for monitoring and regulating the extruder, the nips, and the winding means.

* * * * *

UNITED STATES PATENT AND TRADEMARK OFFICE
CERTIFICATE OF CORRECTION

PATENT NO. : 5,458,841
DATED : October 17, 1995
INVENTOR(S) : Jack N. Shirrell

It is certified that error appears in the above-indentified patent and that said Letters Patent is hereby corrected as shown below:

Column 8, Line 8 "die is" should read —die 30 is —

Column 10, Line 9-10 "engaging the stretched" should read —engaging the cooled stretched —

Column 11, Line 10 "maintaining u sufficient" should read —maintaining sufficient —

Signed and Sealed this

Seventh Day of May, 1996

Attest:

BRUCE LEHMAN

Attesting Officer

Commissioner of Patents and Trademarks